United States Patent [19]

Smith

[11] Patent Number: 4,597,712
[45] Date of Patent: Jul. 1, 1986

[54] TRAILER APPARATUS FOR TRANSPORTING VEHICLES AND OTHER CARGO

[75] Inventor: Earl D. Smith, Scottsdale, Ariz.

[73] Assignee: Dallas Smith Engineering Corporation, Phoenix, Ariz.

[21] Appl. No.: 519,388

[22] Filed: Aug. 1, 1983

[51] Int. Cl.[4] .............................................. B60P 1/00
[52] U.S. Cl. ...................................... 414/549; 212/189; 414/253; 414/555; 414/733; 414/751
[58] Field of Search ............... 414/546, 549, 555, 241, 414/253, 255, 256, 733, 738, 749, 751, 680, 539-545; 212/189, 195; 410/4, 24, 26; 105/378; 104/89, 94; 901/1

[56] References Cited

U.S. PATENT DOCUMENTS

| | | | |
|---|---|---|---|
| 1,247,553 | 11/1917 | Linquist et al. | 410/14 |
| 1,282,765 | 10/1918 | Daly | 410/26 |
| 1,324,105 | 12/1919 | Daly | 410/14 |
| 3,043,454 | 7/1962 | Butler et al. | 410/26 |
| 3,295,881 | 1/1967 | Worthington | 414/542 |
| 3,426,700 | 2/1969 | Klamp | 104/94 |
| 4,274,789 | 6/1981 | Martin et al. | 414/542 X |
| 4,297,071 | 10/1981 | Dunbar | 414/542 |

FOREIGN PATENT DOCUMENTS

| | | | |
|---|---|---|---|
| 1441396 | 6/1976 | United Kingdom | 410/24 |
| 419429 | 8/1974 | U.S.S.R. | 414/549 |

*Primary Examiner*—Robert J. Spar
*Assistant Examiner*—David A. Bucci
*Attorney, Agent, or Firm*—Woodard, Weikart, Emhardt & Naughton

[57] ABSTRACT

An enclosed trailer apparatus adapted for carrying either vehicles or other types of cargo. The trailer apparatus includes a pair of matched, arm assemblies including several pivotally connected arms operable by a hydraulic system. The arms are mounted to a carriage within the trailer and moveable longitudinally of the trailer. The arms are extendable outside of the trailer to grasp and load vehicles into position within the trailer. Wheel bars for facilitating the carrying of the vehicles and the supporting of the vehicles with the trailer are also disclosed.

10 Claims, 23 Drawing Figures

TRAILER APPARATUS FOR TRANSPORTING VEHICLES AND OTHER CARGO

BACKGROUND OF THE INVENTION

1. Field of the Invention

The present invention relates generally to a trailer apparatus, and more particularly to a trailer which is specially adapted for transporting automobiles and which is convertible for the transportation of other types of products or cargoes.

2. Description of the Prior Art

A variety of trailers have been proposed in the prior art for the transportation of various goods. Some of these trailers have been specifically suited for carrying certain types of goods. A prime example of those types of trailers dedicated to a particular purpose are the trailers designed for the transportation of automobiles and other types of vehicles. Such trailers typically comprise a framework supported on a base and carrying several tracks over which the cars may be moved to place them on the trailer and remove them from the trailer. Such trailers typically have been relatively open and have included tracks which are rigidly fixed in the position for transporting automobiles. In certain types of these trailers, low sidewalls have been included to provide protection for the automobiles being carried. Examples of trailers falling under this description are contained in U.S. Pat. Nos. 2,695,810, issued to Demos on Nov. 30, 1954; U.S. Pat. No. 2,667,377 issued to Stuart on Jan. 26, 1954; U.S. Pat. No. 2,654,612, issued to Francis on Oct. 6, 1953; and U.S. Pat. No. 2,583,734, issued to Francis on Jan. 29, 1952.

These prior art trailers for transporting automobiles have been well suited for that purpose, but have not been appropriate for the transportation of other types of cargoes. Consequently, the utility of such trailers is limited, and there is a particular problem in that after the vehicles have been delivered to the destination, the trailer must "dead head," or in other words travel unloaded, back to the origin. Because of this fact, the use of such traliers is quite inefficient, and also the trailers are totally useless when automobiles are not intended to be transported.

A further problem with trailers designed for carrying vehicles has been the difficulty with which the vehicles are loaded into the trailer. For specially designed trailers adapted for vehicle transportation exclusively, this has not been a particular problem because the trailer includes several tracks which direct the vehicles to different carrying positions. However, the present invention provides a trailer which is readily adaptable for carrying not only vehicles, but other types of cargo, and for carrying such within an enclosed body. It is difficult to provide a trailer which permits ready loading of these two types of cargo.

Various other types of trailers have been proposed in the prior art for carrying cargoes. The typical trailer is a closed box having a pair of doors at the rear end for receiving cargo. Alternately, the doors may be placed at other locations, or the trailer may have partial openings to facilitate loading and unloading of cargo.

By contrast to the prior art, the present invention provides an enclosed trailer which is readily adapted for transporting other types of goods besides automobiles. As a result, the present invention has the advantage that the trailer does not have to "dead head" back to its origin since it can quickly be converted to carrying other types of goods along that route. Also, the trailer need not lay idle while automobiles are not needed to be transported, since it can be used for other purposes and thus employed more frequently and more efficiently.

At least a few devices have been proposed which would carry vehicles in an enclosed body. Examples of such devices are disclosed in U.S. Pat. Nos. 1,994,695, issued to Dolan et al. on Mar. 19, 1935; U.S. Pat. No. 2,432,228, issued to De Lano on Dec. 9, 1947; U.S. Pat. No. 2,461,927, issued to Schaldach et al. on Feb. 15, 1949; and U.S. Pat. No. 2,523,723, issued to Santee et al. on Sept. 26, 1950. Other references relating to storage or transportation of vehicles include U.S. Pat. Nos. 1,247,553, issued to Lindquist et al. on Nov. 20, 1917; U.S. Pat. No. 1,324,105, issued to Daly on Dec. 9, 1919; U.S. Pat. No. 1,809,557, issued to Lishon on June 9, 1931; U.S. Pat. No. 3,933,258, issued to Forsyth et al. on Jan. 20, 1976; U.S. Pat. No. 2,797,960, issued to Endres et al. on July 2, 1957; U.S. Pat. No. 1,254,920, issued to Mathias on Jan. 29, 1918; U.S. Pat. No. 2,998,102, issued to Deverich on Aug. 29, 1961; and U.S. Pat. No. 2,782,076, issued to Miller on Feb. 19, 1957.

SUMMARY OF THE INVENTION

Briefly describing one aspect of the present invention, there is provided an enclosed trailer having several supports within the trailer for supporting vehicles during transportation. The trailer also includes a powered means mounted within the trailer for loading vehicles into the carrying positions. In a particular embodiment, the powered loading means includes hydraulically powered arm assemblies which are extendable from the trailer to grasp and lift the vehicles into the trailer. Also in a particular embodiment the powered means includes a carriage which is movable longitudinally of the trailer to facilitate loading of the vehicles.

It is an object of the present invention to provide a trailer apparatus adapted for carrying vehicles and the like.

It is another object of the present invention to provide an enclosed trailer which is suitable for transporting vehicles.

A further object of the present invention is to provide an enclosed trailer which is readily converted to permit the transporting of either vehicles or other types of cargo.

It is another object of the present invention to provide a trailer apparatus designed for the transportation of vehicles and including powered loading means mounted to the trailer for facilitating the loading and unloading of automobiles into the trailer.

Further objects and advantages of the present invention will become apparent from the description of the preferred embodiment which follows.

DESCRIPTION OF THE PREFERRED EMBODIMENT

Figure 1:
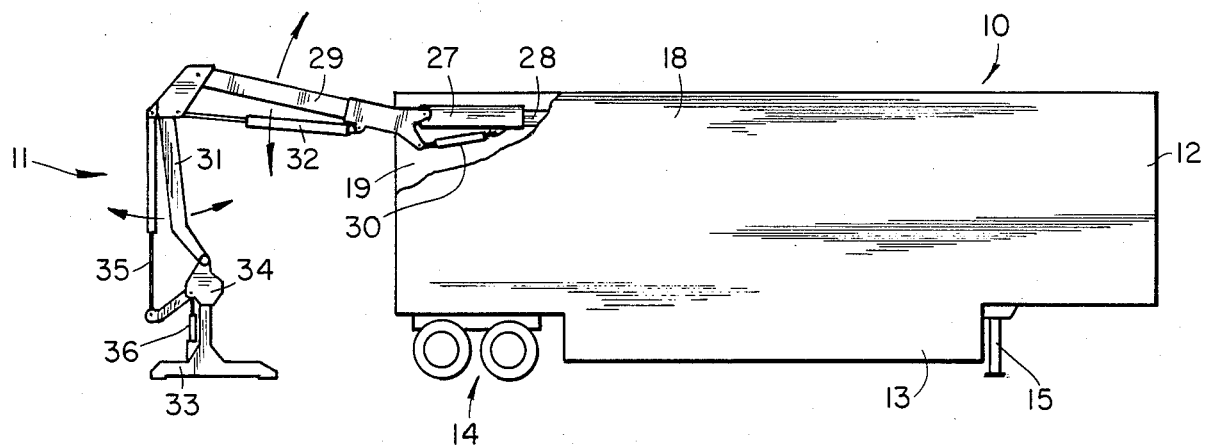
FIG. 1 is a side, elevational view of a trailer including a powered loading system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a trailer 10 having a loading system 11 constructed in accordance with the present invention. The trailer 10 may be generally of standard design and construction, with several important exceptions which will become apparent from the following description. These differences are particularly related to providing a suitable trailer configuration which is adapted for mounting and carrying automobiles, as well as other types of cargo, in the preferred embodiment of the present invention.

As shown, the trailer 10 includes a body 12 mounted upon a supporting frame 13. In usual fashion, the frame 13 is mounted upon wheels 14 and includes typical front support legs 15 which may be lowered or raised depending on the use of the trailer.

The body 12 of the trailer defines a complete enclosure within which various types cargo may be received. A particular aspect of the present invention is that it provides a trailer that will self-load and thereafter carry a number of automobiles, and at the same time may be quickly adapted for carrying other types of cargo. The full enclosure defined by the body 12 is therefore desirable both to provide a more advantageous transportation of vehicles, and at the same time to provide standard carrying of other types of cargo normally hauled by standard trailers.

Figure 2:
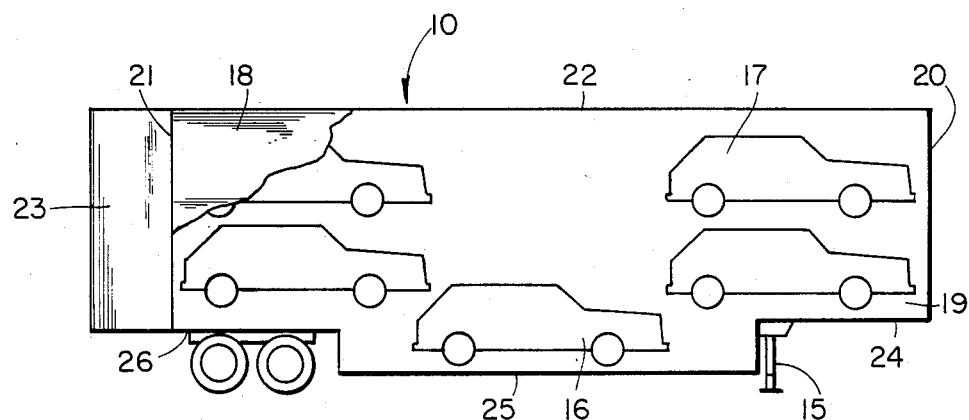
FIG. 2 is a side, cross-sectional view of a trailer constructed in accordance with the present invention, and particularly showing in schematic fashion the location of vehicles carried therein.
Figure 3:
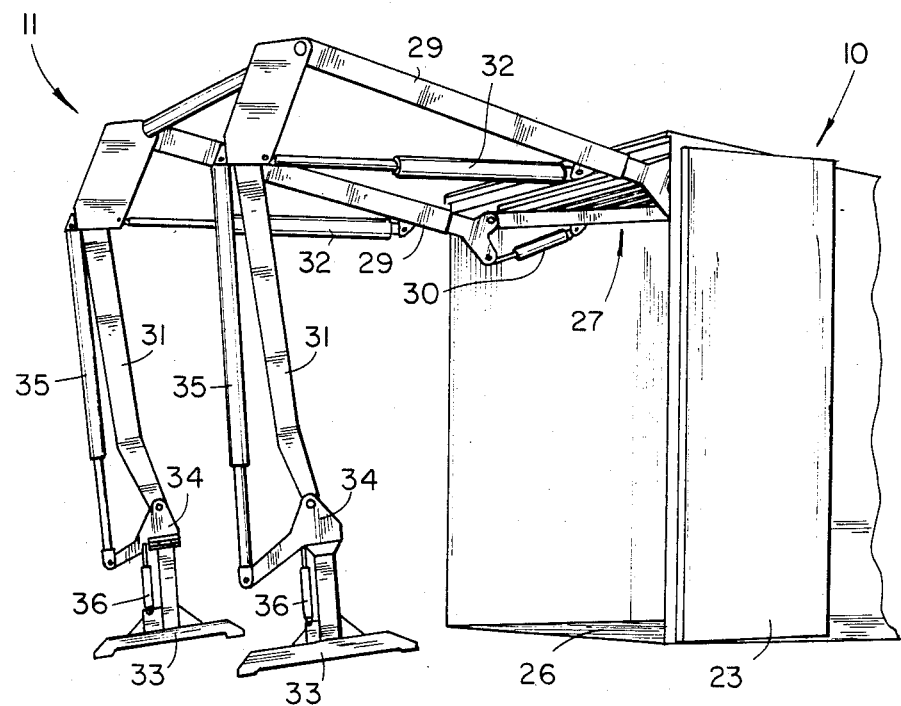
FIG. 3 is a perspective view of a loading system useful with the trailer of the present invention.

In FIG. 2, for example, there is a somewhat schematic representation of the trailer of FIG. 1 with the near side removed to show the carrying of several vehicles, such as 16 and 17, within the trailer. The body 12 includes side walls 18 and 19, front wall 20, rear wall 21 and top wall 22. The rear wall 21 is preferably defined by a pair of hinged doors, such as 23, which are hingedly attached at the rear end of the side walls and pivot together to enclose the rear of the trailer.

As shown particularly in FIG. 2, the floor of the trailer is divided into three sections, namely the front floor 24, the recessed, center floor 25, and the rear floor 26. The inclusion of the recessed center floor permits the reception of a vehicle, such as 16, down upon that floor to permit the trailer to carry five vehicles in the embodiment shown. In an alternate embodiment, the trailer is extended lengthwise to receive a pair of vehicles on the recessed center floor 25. In that instance, the trailer is able to carry eight vehicles since the lengthened body of the trailer permits vertically-stacked cars to be carried above the two vehicles received upon the center floor.

In FIG. 1 there is provided a schematic view of the major components for the preferred construction of the loading system 11. The loading system 11 includes a carriage 27 which includes wheels that roll along a longitudinal track 28 that extends the length of the trailer. Pairs of primary arms, such as 29, are pivotally attached to the carriage 27 and are operable to be raised and lowered by means of primary hydraulic cylinders, such as 30. Pairs of secondary arms, such as 31, are pivotally attached to the primary arms and are operable to be pivoted relative the primary arms by means of the secondary hydraulic cylinders, such as 32.

The vehicles are lifted upon a pair of opposed clamp arms, such as 33. Clamp arm 33 is pivotally mounted to the secondary arm 31 by means of a mounting bracket 34. A levelling hydraulic cylinder 35 connects between the secondary arm 31 and the mounting bracket 34 and is operable to adjust the horizontal position of the clamp arm 33 in order to maintain a desired level orientation during loading of the vehicle. The clamp arm 34 is also pivotally mounted to the mounting bracket 34 about a second horizontal axis, and is operable by means of the clamping hydraulic cylinder 36 to be pivoted toward or away from the vehicle in order to clamp or release the vehicle.

Figure 4:
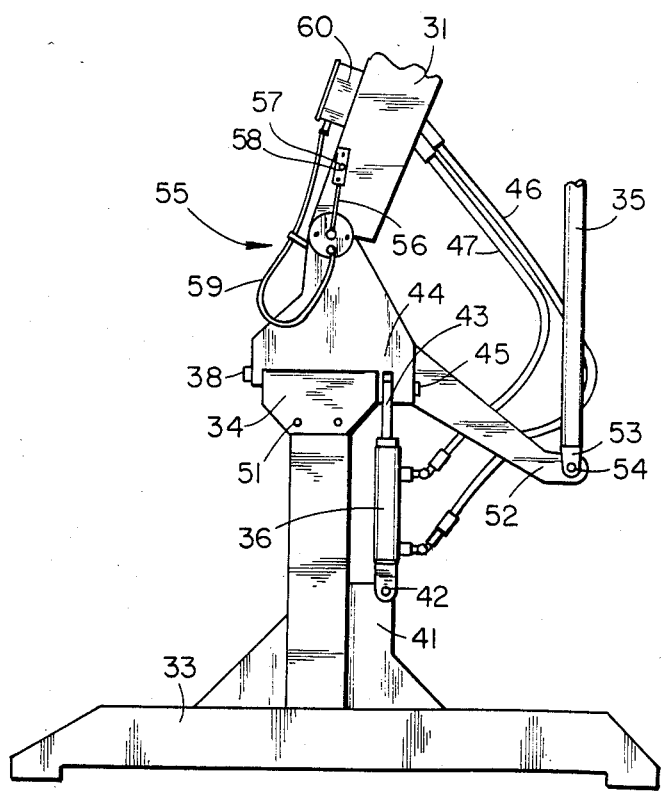
FIG. 4 is a side, elevational view of the outside of the left clamping arm.
Figure 5:
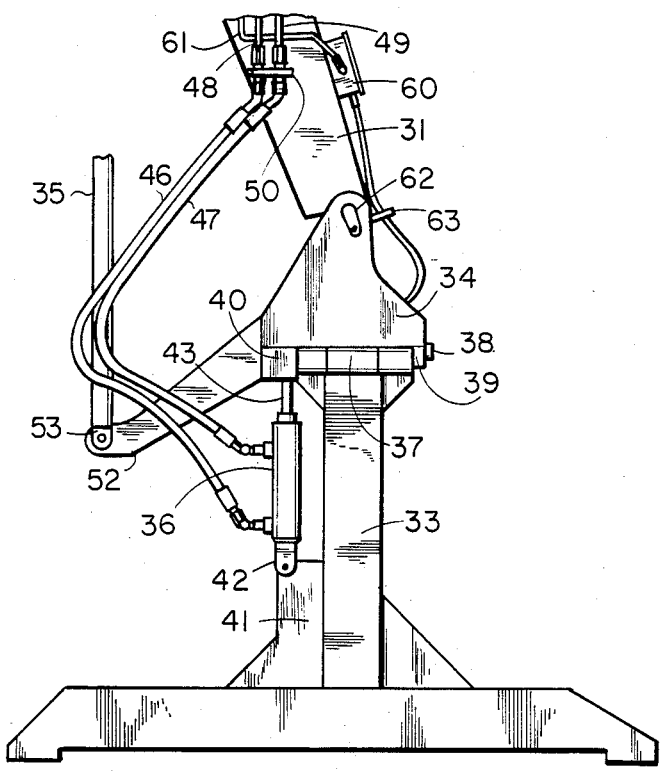
FIG. 5 is a side, elevational view of the inside of the left clamping arm.

Referring in particular to FIGS. 4 and 5, the mounting of the clamp arm and cylinder is more particularly shown. As previously indicated, there are a pair of clamp arms, one mounted on each side of the trailer and operable to engage one side of a vehicle. FIG. 4 presents the outside view of the left clamp arm, meaning the clamp arm on the left side of the trailer when the trailer is viewed from the rear. FIG. 5 provides a view also of the left clamp arm but looking from the inside.

The clamp arm 33 is hingedly mounted to the mounting bracket 34. Clamp arm 33 includes a cylindrical portion 37 within which is received a hinge pin 38 extending in a horizontal direction. The mounting bracket 34 defines a yoke having arms 39 and 40, with the hinge pin 38 extending through aligned apertures in the arms 39 and 40 and being threadingly engaged with the arm 40. The clamp arm 33 is thereby pivotable about a horizontal axis with respect to the mounting bracket 34. This enables the clamp arm to be moved inwardly or outwardly to either engage or disengage a vehicle, respectively.

For this purpose, a clamping hydraulic cylinder 36 is provided. The cylinder 36 is connected with the plate 41 which is in turn secured to the clamp arm by welding and thereby provides both a point of attachment for the clamping cylinder 36 and also reinforcement for the generally T-shaped clamp arm. The cylinder 36 is attached to the plate 41 by means of a pivot pin 42 extending through aligned apertures in the plate 41 and the yoke portion of the clamping cylinder 36, and is held in place by means of a cotter pin or other suitable means. The piston 43 of the clamping cylinder extends within a second yoke portion 44 of the mounting bracket 34. A pivot pin 45 extends through aligned apertures in the yoke portion 44 and in the piston 43, and is secured within the yoke portion to provide a pivoting connection of the piston with the mounting bracket.

Hydraulic fluid supply and return lines 46 and 47 extend from the clamping cylinder 36 to the secondary arm 31. A pair of corresponding fluid lines 48 and 49 are mounted to the secondary arm 31 and terminate in connectors mounted to a bracket 50. The hydraulic lines 46 and 47 are similarly terminated in connectors, and are thereby attached with the hydraulic lines 48 and 49 at the location of the bracket 50. As will be evident from subsequent discussions, the hydraulic lines 48 and 49 are directed back to a hydraulic pump, along with several other hydraulic lines, by means of hydraulic valves situated within the trailer. It will therefore be appreciated that operation of the hydraulic clamping cylinder 36 will cause the clamp arm to pivot about the horizontal axis of the connecting pin 38, and will therefore pivot either inwardly or outwardly as desired.

The mounting bracket 34 includes stops to limit the extent of travel possible for the clamping arm. In addition to the structural stops, a pair of set screws 51 are provided at the outer side of the clamp arm to permit adjustment for the outward travel of the arms. When operated in clamping onto a vehicle, the inward travel of the arms is limited by engagement of the arms with the vehicle support grid. With respect to the outward travel, however, it is desirable to limit the outward travel so that the clamp arms will not accidentally be positioned in a manner that would hit the rear of the trailer as the clamp arms are moved to the interior of the trailer. The provision of set screws 51 will therefore permit this outer travel of the clamp arms to be adjusted to ensure that the clamp arms will clear the interior of the trailer when in their outward most position.

The mounting bracket 34 includes a rearwardly-extending arm 52 to which is connected the levelling cylinder 35. The piston member of the cylinder 35 is secured to a yoke bracket 53 which is received about the arm 52. A hinge pin 54 extends through the aligned apertures of the yoke bracket 53 and arm 52, and is retained in place by cotter pins or other suitable means. The purpose for the levelling cylinder 35 is to maintain the clamp arm 33, and therefore the carried vehicle, in a horizontal plane.

The mounting bracket 34 is pivotally connected with the secondary arm 31 by means of a pivot pin 62 in the manner previously described. The upper portion of the bracket 34 defines a yoke 63, and the pivot pin is received through aligned apertures in the yoke portion 63 and the end of the second arm 31 to provide the pivotal attachment. A potentiometer is used to sense the angle of tilt of the clamp arm 33, and the levelling cylinder 35 is then used to adjust the tilting back to horizontal. The potentiometer 55 is mounted at the connection of the mounting bracket 34 and secondary arm 31 with the body of the potentiometer rotating with the clamp arm.

The wiper is affixed relative the secondary arm. The wiper is connected to an arm 56 which is in turn connected with a slotted connector 57. A bolt 58 extends through the slot in the connector 57 and is received within the secondary arm 31. The slotted connector is therefore free to move in every direction except in a direction permitting the arm 56 to rotate relative the secondary arm. This fixes the rotational position of the wiper relative the secondary arm, while avoiding problems, such as binding, which might occur due to the relative rotation of the mounting bracket 34 and the secondary arm 31.

The electrical connection of the potentiometer is accomplished by cables extending through the conduit 59 and into the junction box 60. Additional conduit 61 extends from the junction box and upwardly along the secondary arm 31, permitting electrical connection of the potentiometer with the trailer. This positioning of potentiometer 55 thereby provides information as to the angular or rotational position of the clamping arm 33. In the preferred embodiment, the present invention utilizes a computer to receive information from the potentiometer 55 and to thereby operate the levelling cylinder 35 to maintain the clamp arm in the desired, horizontal position.

Figure 6:
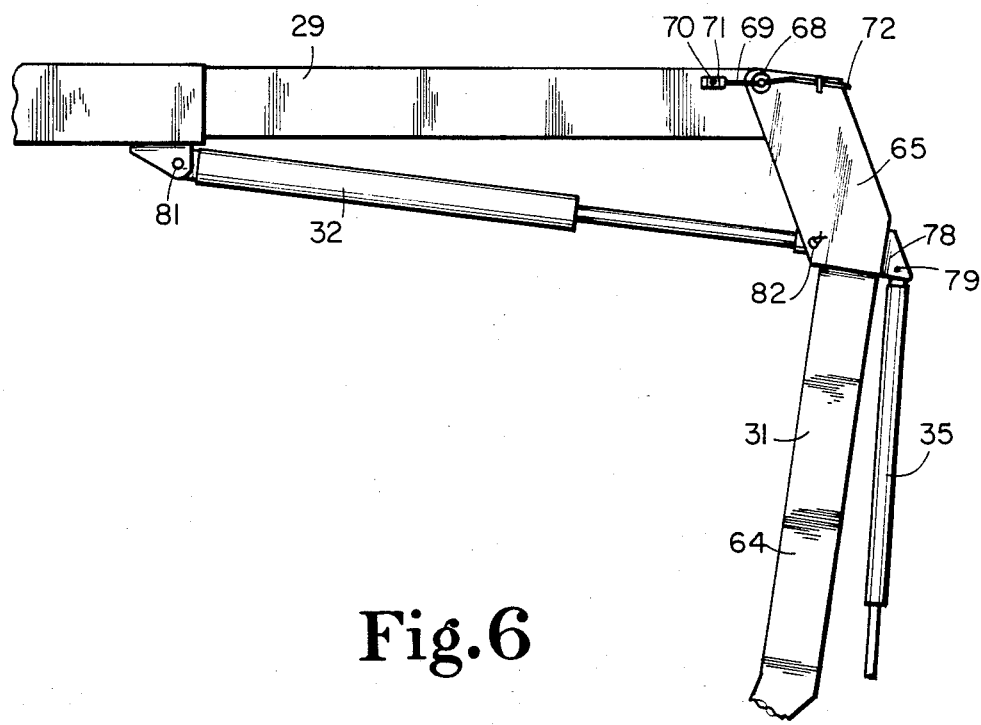
FIG. 6 is a side, elevational view of the outside of the left secondary and primary arms.
Figure 7:
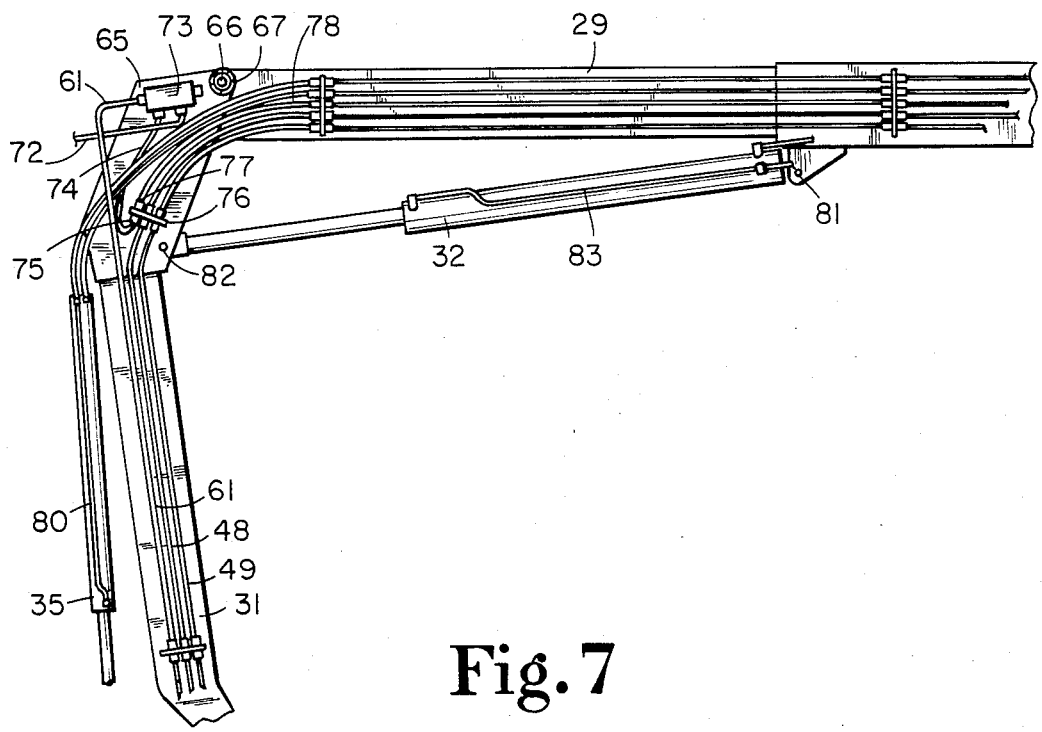
FIG. 7 is a side, elevational view of the inside of the left secondary and primary arms.

Referring now in particular to FIGS. 6 and 7, the primary arm 29 and secondary arm 31 are shown in greater detail. FIG. 6 presents an outside view of the left arm assembly, and FIG. 7 provides an inside view of the same assembly.

The secondary arm 31 comprises an elongated arm member 64 connected, as by welding, to a mounting bracket 65. Bracket 65 includes a pair of opposed plates which receive therebetween the end of the primary arm 29. A pivot pin 66 extends through aligned apertures in the opposed plates for the back of 65 and in the end of the primary arm 29, and thereby provides a pivoting connection between the secondary arm 31 and the primary arm 29. On the inside of the bracket 65 there is secured a cylinder 67 which is attached to the bracket, as by welding, around the pivot pin 66. This cylinder 67 extends between the paired secondary arms, such as 31, and stabilizes the overall arm assembly with respect to both the space between the arms and the orientation of the arms.

A potentiometer 68 is mounted at the axis of rotation for the bracket 65 relative the primary arm 29. The potentiometer 68 includes an arm 69 and a connector 70 received over a bolt 71 which is secured to the primary arm 29. The potentiometer 68 operates and is constructed in a fashion essentially identical to that for potentiometer 55 previously described. A conduit 72 extends around to the inside of the bracket 65 and connects with a junction box 73. Conduit 61 (FIG. 7) similarly extends to the junction box 73 and a single conduit 74 extends to a connector 75 securable to a mounting member 76. A second connector 77 connects with a conduit 78 which extends along the primary arm 29, and the connector 77 is attachable also to the mounting member 76 and thereby to the connector 75. As will be apparent from the drawings, the various conduits utilized for both electrical and hydraulic connections extend along and attach to the various arms by means of such mounting members as 76. The location and function of the various mounting members and connectors for such conduits are apparent from the drawings and from the foregoing descriptions, and further explanations as to these components of the present system will therefore not be provided. Shown in the drawings is a preferred embodiment for the placement of the various conduits in order to achieve an efficient and compact layout. At the same time, it will readily appreciated that the particular placement and methods of attachment for these conduits to the arm assemblies does not form a particular part of the present invention, and the alternative methods and choices for the layout of such conduits would be well within the skill in the art.

It has previously been indicated that the clamp arms 33 are connected with mounting brackets, such as 34, and are in turn pivotally attached to the secondary arm 31. This pivotal movement of the clamp mounting bracket 34 to the secondary arm 31 is controlled by the levelling hydraulic cylinder 35. A yoke bracket 78 is secured, as by welding, to the bracket 65. In conventional fashion, the levelling cylinder 35 is secured to the yoke bracket 78 by means of a pin 79 received through aligned apertures in the bracket and cylinder unit, with the pin being retained in place by means of a cotter pin or the like. The levelling cylinder 35 is thereby pivotally attached to the bracket 78. Hydraulic lines, such as 80, extend from the cylinder 35 to permit operation of the hydraulic cylinder as previously indicated.

Pivoting of the secondary arm 31 with respect to the primary arm 29 is controlled by a secondary hydraulic cylinder 32. One end of this cylinder is connected by pin 81 to the primary arm 29, and the other end is connected by pin 82 to the bracket 65. Hydraulic lines, such as 83, extend to the trailer and permit control of the hydraulic cylinder to pivot the secondary arm. In the same fashion as previously described, the potentiometer 68 provides information, preferably to an on-board computer, to enable suitable control of the cylinder 32 and therefore of the rotational position of the secondary arm 31.

Figure 8:
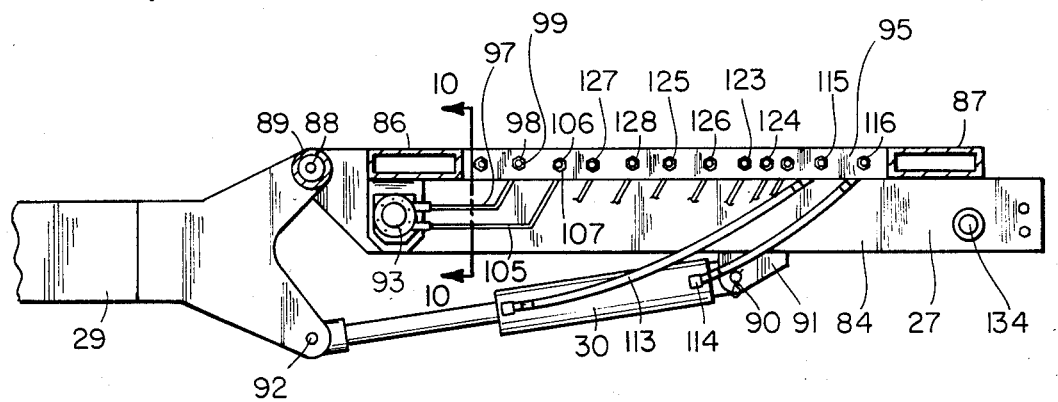
FIG. 8 is side, cross-sectional view of the left side of the carriage, and particularly showing the attachment of the primary arm and primary cylinder thereto.
Figure 9:
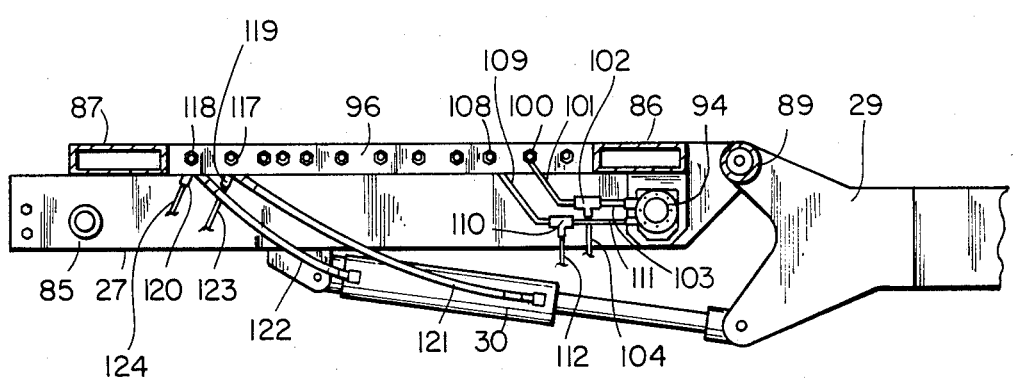
FIG. 9 is a side, cross-sectional view of the right side of the carriage.

Referring now in particular to FIGS. 8 and 9, there is shown the carriage 27 and the mounting thereto of a primary arm 29. The carriage includes side members 84 and 85 interconnected by cross members 86 and 87. As will be further described, wheels are mounted to the carriage 27 to provide for rolling of the carriage longitudinally of the trailer 10 along tracks mounted on the interior walls of the trailer.

The primary arms, such as arm 29, are pivotally mounted to the carriage by pivot pins, such as 88 (FIG. 8). A cylinder 89 is secured, as by welding, to the primary arm 29, and extends transversely of the trailer to the opposite primary arm and is also secured thereto. The cylinder 89 thereby provides added strength for the parallel spacing of the primary arms, and further assists in coordinating the rotational positions of the corresponding primary arms.

The primary cylinder 30 is secured at one end through a pivot pin 90 received in a yoke bracket 91 attached to the carriage. The other end of the cylinder 30 is secured by a pin 92 to the primary arm 29. The cylinder is operable to rotate the primary arm about the axis of the pivot pin 88, to thereby raise and lower the primary arm as desired.

The embodiment of the present invention shown in the drawings is advantageous since it provides a system which can be used in conjunction with a trailer of standard dimensions. One manner of accomplishing this end is by the provision of arm assemblies and associated apparatus which are extremely compact and are located in positions which do not interfere substantially with the interior storage space of the trailer. The arm assemblies which have been previously described are positioned at the opposite interior sides of the trailer when retracted within the trailer, and thereby do not occupy a significant amount of storage space. The supporting carriage and accessory equipment are similarly configured and positioned to occupy a minimum of the interior volume or space of the trailer.

The carriage assembly has been designed to retain the space occupied by the various components at a minimum. First, a pair of hydraulic fluid motors 93 and 94 are utilized to achieve a desired capacity without requiring a single, large motor. The motors are directly connected by means of a pair of hydraulic lines, namely the pressure and return lines, which extend between the motors adjacent the sealing of the trailer. For this purpose, a flat bar 95 extends between and is connected with the cross members 86 and 87 adjacent to the side member 84. A similar bar 96 extends between and is connected with the cross members adjacent the other side member 85. These bars include apertures within which are received couplings for the hydraulic fluid lines. The motor 93 on the left side of the trailer connected with one of the couplings 98 secured to the bar 95. A pipe 99 extends horizontally from the coupling 98 adjacent the top of the trailer and connects with a second coupling 100 mounted to the opposite bar 96. A pressure line 101 connects from the coupling 100 to a T fitting 102. A second pressure line 103 extends from the motor 94 to the T fitting 102, and a third pressure line 104 extends also from the T fitting. Similarly, a return line 105 connects from the hydraulic motor 93 to a coupling 106 mounted on the support bar 95. A pipe 107 extends adjacent the ceiling of the trailer and connects with a coupling 108 that connects through line 109 to a T fitting 110. The return line 111 of the second motor 94 also connects with the T fitting 110 and a combined return line 112 extends from the T fitting.

It has previously been indicated that several of the hydraulic cylinders include pressure and return lines, in customary fashion, which extend along the arm assemblies to the carriage. As will be further described, the pressure and return lines 104 and 112, respectively, connect with these various hydraulic cylinder lines by means of valves mounted to the carriage.

In order to facilitate a coordinate action of the left and right arm assemblies, and also to maintain a low profile for the supporting components on the carriage, the corresponding pressure and return lines are also interconnected through pipes which extend transversely on the carriage adjacent the ceiling of the trailer. These transverse pipes and associated couplings are substantially identical with those described with respect to the hydraulic motors 93 and 94, and detail as to each separate fluid lines is not necessary. By way of example, the primary cylinder 30 includes hydraulic fluid lines 113 and 114 which connect with couplings 115 and 116, respectively, mounted on the side member 84 of the carriage. As described with respect to the hydraulic pumps, there are pipes extending across the carriage and connect with the couplings 117 and 118, respectively. On the outside of the support bar 96 are positioned T fittings 119 and 120 which connect with the couplings 117 and 118, respectively, and also with the hydraulic lines 121 and 122, respectively, of the primary cylinder 30.

The hydraulic pressure and return lines 121 and 122 extend from the primary cylinder 30 to the T fittings 119 and 120, respectively, and combined hydraulic lines 123 and 124 extend from the T fittings to the associated valves utilized to control operation of the primary cylinders.

As indicated, particular details as to the connections for the various hydraulic cylinders is not being provided since these connections are essentially identical to those already described with respect to the primary cylinder 30. By way of further example, the couplings 115 and 116 have been indicated as being for connection with the primary cylinder 30. Couplings 123 and 124 are provided for connection with the secondary cylinder, couplings 125 and 126 connect with the levelling cylinders and couplings 127 and 128 connect with the clamping cylinder. These couplings and the associated cylinder lines connect with corresponding couplings and lines on the other side of the carriage in the same manner as described with respect to the primary hydraulic cylinder lines, and in turn connect with associated valves for operation of the related cylinders.

Figure 10:
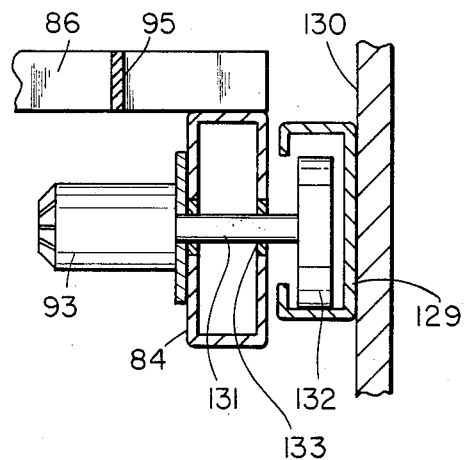
FIG. 10 is a partial, cross-sectional view of the left side of the carriage, taken along line 10—10 in FIG. 7 and looking in the direction of the arrows.
Figure 11:
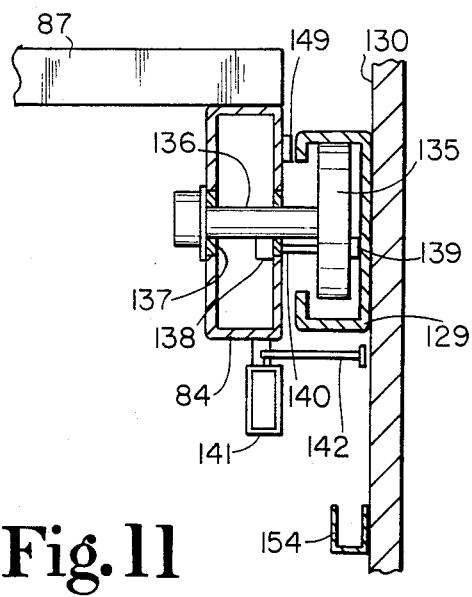
FIG. 11 is a partical, cross-sectional view of the left side of the carriage, taken along line 11—11 in FIG. 12 and looking in the direction of the arrows.

Additional details for the mounting and operation of the carriage 27 are provided in particular in FIGS. 10 and 11. As shown in FIG. 10, the carriage includes wheels that rise along a track mounted on the inside wall of the trailer. More particularly, the track 129 is secured on the inside surface 130 of the trailer wall by suitable means, typically by bolting into the wall framework. The hydraulic motor 93 is mounted onto the side rail 84 and drives an axle 131 on which the wheel 132 is received. The axle 131 is received by bearings, such as 133, mounted within the vertical walls of the side rail 84. The wheel 132 is received within the track 129 and preferably includes a knurled surface to enhance the frictional engagement of the wheel with the track. As shown in FIG. 10, the diameter of the wheel is slightly less than the vertical opening for the track to provide clearance between the top of the wheel and the inside of the track. The rearward wheels, such as 132, are received against the bottom of the track. Conversely, the carriage also includes front wheels mounted upon the bearingly-received axles, such as 136. In contrast to the rear, drive wheels, the front wheels engage the inside top surface of the track and have a clearance between the bottom of the wheel and the bottom of the track. It will be appreciated that the natural downward force exerted at the rear of the carriage, due to the clearance between the wheel diameters and the interior of the track, will cause the carriage to cant rearwardly, thereby providing the engagement of the bottom surfaces for the rear wheels and the upper surfaces of the front wheels with the respective portions of the track.

As shown in FIG. 11, (correct references to FIGS. 10 and 11) a front wheel 135 is secured to an axle 136 received by bearings 137 mounted in the side rail 84. Due to the canting of the carriage, the upper surface of the wheel 135 bears against the upper interior surface of the track 129.

The carriage is provided with an optical sensor 138 which is utilized to evaluate the forward or rearward position of the carriage with respect to the length of the trailer. The sensor 138 includes a wheel 139 mounted on an arm 140 which is spring biased to maintain the wheel 139 in engagement with the inside, vertical wall of the track 129. The sensor may comprise an encoder which in the preferred embodiment includes five hundred slits per revolution which are monitored by the optical sensor to indicate the rotational position of the wheel 139 and also the number of revolutions which the wheel has turned. In this, conventional fashion, the encoder is used to evaluate the position of the carriage with respect to the trailer. Working in concert with the encoder is a microswitch 141 which includes an arm 142 extending in the direction of the trailer wall. A pair of trips are fastened on the inside surface 130 of the trailer wall in a position to contact the arm 142 as the carriage moves along the trailer. These trips are placed, for example, at the rearward most position for the carriage and at a second position twelve feet therefrom. The tripping of the microswitch therefore operates to provide a reference point for the encoder, and also to set a standard for the encoder to determine the number of revolutions corresponding with the carriage travel of twelve feet. This latter feature serves both a double check that the encoder is working properly, and also to compensate for variations which may occur from thermal expansion of the trailer or track wall, or other components.

Figure 12:
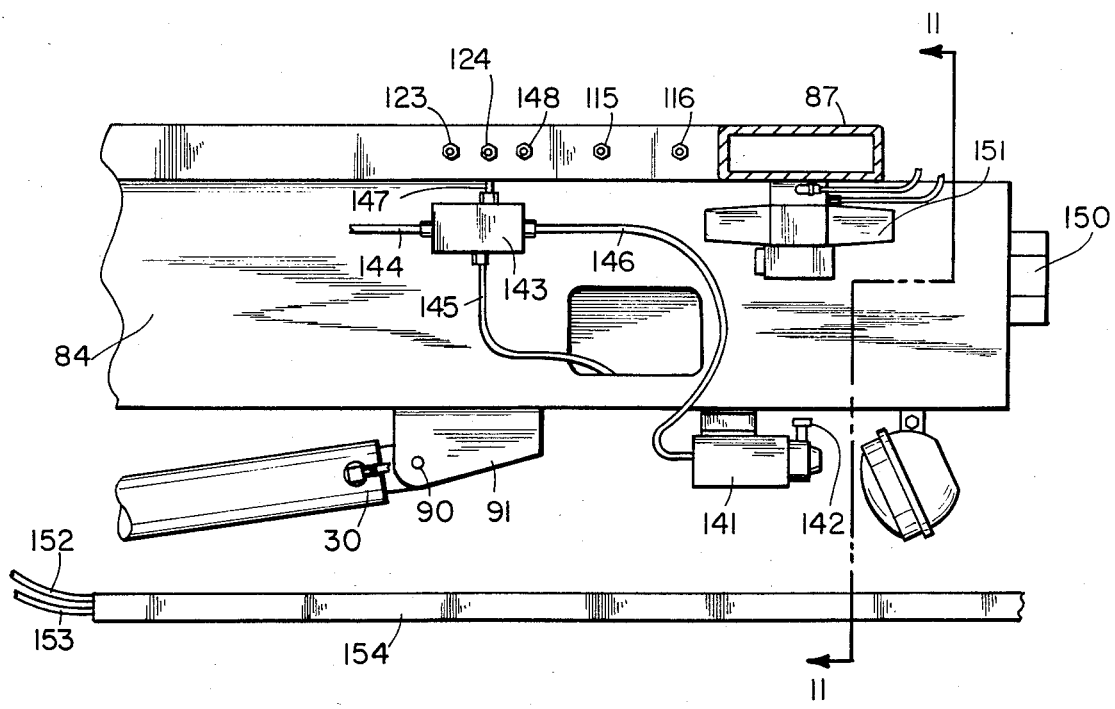
FIG. 12 is a partial, left side cross-sectional view of the forward end of the carriage.

As shown particularly in FIG. 12, a junction box 143 is mounted to the carriage wall and connections 144, 146 extend to the previously-identified potentiometers, the encoder and the microswitch, respectively. A fourth conduit 147 extends to a coupling 148 which spans across the carriage to facilitate connections of these various components with the control components mounted on the other side of the carriage.

The carriage is also provided on each side with front and back guide rollers which are oriented to roll along the inside vertical wall of the tracks, such as 129, to prevent binding of the carriage with the trailer. It will be appreciated that the guide rollers are oriented in the same general fashion as the roller 139 of the encoder 138 in order to roll along a side wall surface when coming into contact with such surface. By way of example, a guide roller 149 is shown in FIG. 11 extending outwardly from the side rail 84 and positioned normally about 1/16 the of an inch from the outside surface of the track 129. These guide rollers are not loaded against the sides the trailer but are positioned to make contact prior to the carriage wheels, such as 135, engaging the inside surfaces of the track.

The carriage is also provided with a pair of lock pins to permit locking of the carriage along the length of the trailer at desired positions. The lock pins are provided by standard hydraulic locking units, such as 150, shown in FIG. 12 as being mounted to the front end of the carriage side rail 84. The unit 150 includes a lock pin (not shown) which is operable through the hydraulic unit to either extend horizontally outward from the carriage or to be retracted. In the embodiment shown in the drawings, the valve 151 is mounted on the left side of the carraige the hydraulic fluid lines therefor extend from the fluid pump and reservoir across the carriage and to the valve 151. From the valve the control lines extend to T fittings (not shown) and from the fittings coupled with the lock unit 150 and a second lock unit on the opposite side of the carriage. Alternatively, the valve 151 may be located on the right side of the carriage along with the other valves used by the loading system to control the other hydraulic units. The lock pins for the locking units, such as 150, are spring biased in the outward direction, and are operable by the hydraulic system to be retracted in the unit. In this fashion, the lock pins are retained in the extended position without risk that a loss of hydraulic fluid pressure would cause the carriage to unlock and move freely within the trailer.

As previoulsy indicated, there are provided two hydraulic motors 93 and 94 for driving the drive wheels, such as 132. The advantage of using two separate motors is the elimination of an axle which would extend across the full width of the carriage. The provision of the pairs of guide rollers, such as 149, is therefore particularly useful to prevent any binding of the carriage which might otherwise occur due to a difference in operation of the separate drive motors.

Provisions are made for connection of the desired electrical cables with the carriage components. In particular, the movement of the carriage requires that corresponding travel for the connecting cables also be accommodated. The preferred structure for dealing with the electrical connections with the moveable carriage is shown particularly in FIG. 13.

The connections for the moveable carriage are contained in a pair of cables 152 and 153 which connect with the rearward end of the carriage. These cables extend along the upper, interior wall of the trailer within a trough 154 formed by securement of a U-shaped channel to the trailer wall. The connection cables 152 and 153 extend over a pulley 155 and then are again received within the trough 154, the cables then extend back to about the middle of the trailer wall, at which point they are fixed to the wall, and extend back to appropriate locations, preferably through the interior of the wall.

Figure 13:
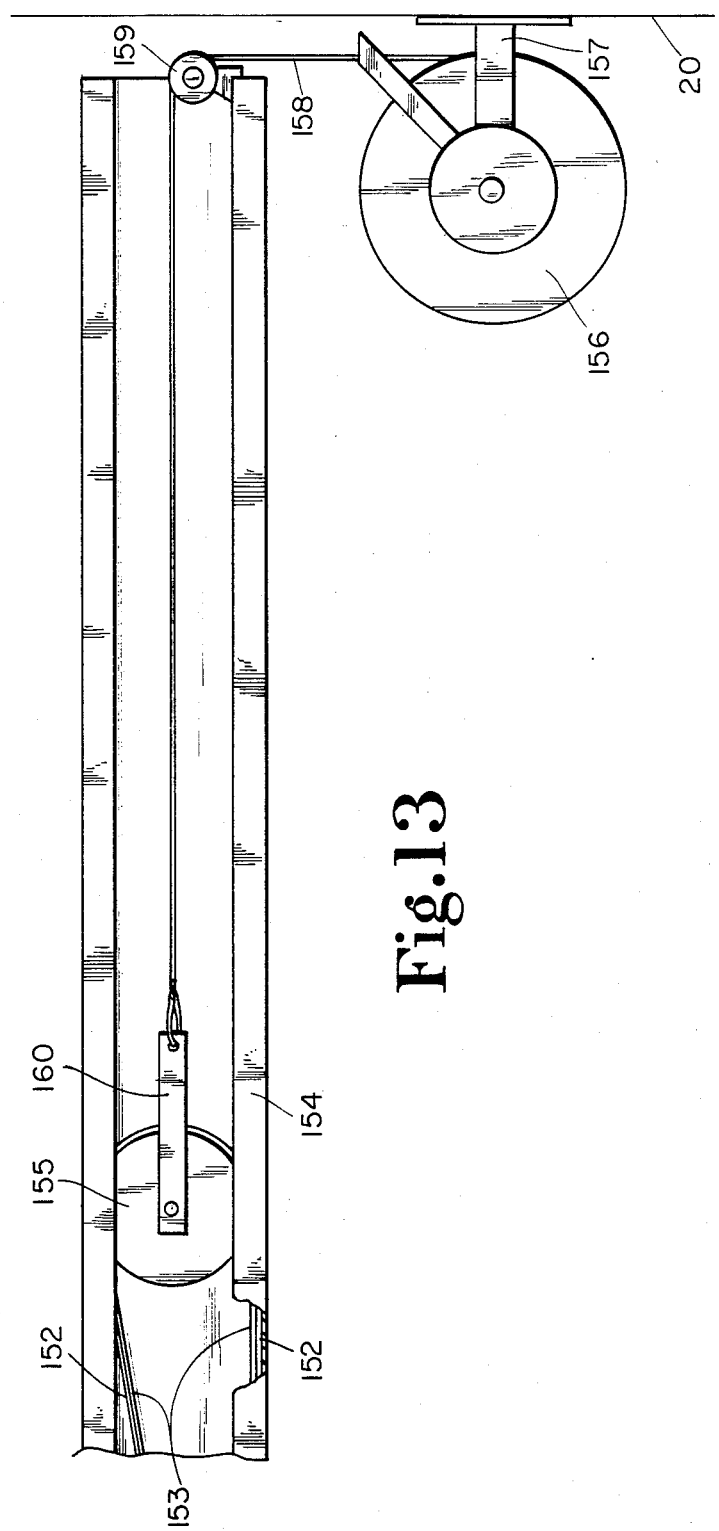
FIG. 13 is a partial, side elevational view of the forward end of the left inside of the trailer, and particularly showing details of a mechanism for taking up slack wire as the carriage moves longitudinally of the trailer.

As the carriage moves longitudinally of the trailer, the pulley 155 is moveable in order to take up the cables 152 and 153. As shown in FIG. 13, a take up reel 156 is mounted by bracket 157 to the interior of the front wall 20. A cable 158 extends about the reel 156 and over a pulley 159 attached to the side wall. This cable 158 connects to a bracket 160 to which the wheel 155 is rotatably mounted. The reel 156 is controlled by a clock spring which urges the reel to rotate in a direction to take up or wind thereon the cable 158. Therefore, as the carriage moves forwardly of the trailer, the reel 156 will pull the pulley 155 toward the front of the trailer, which in doing so will receive the cables 152 and 153 and will lay the cables into the trough 154.

As described, the take up reel 156 is used in conjunction with the pulley 155 to receive the cables and lay them into a track as the carriage moves along the trailer. This arrangement provides for a minimum length of cables to be used since they need only extend from their fixed point at about the middle of the trailer to the furthest point of travel for the carriage, whether forward or rearward of that location. The take up reel 156 is constructed in the manner of static discharge reels and may include, for example, a clock spring to provide the rotational bias.

The cables 152 and 153 may include the desired electrical or other connections between the moveable carriage and the trailer. For example, one cable may include the electrical power lines with the live line being contained in the cable on one side of the carriage and the ground being contained in a cable on the other side of the carriage. Also provided for connection with the carriage is a four conductor cable to extend from the computer to the control keyboard, and the hydraulic fluid supply and return lines.

Figure 14:
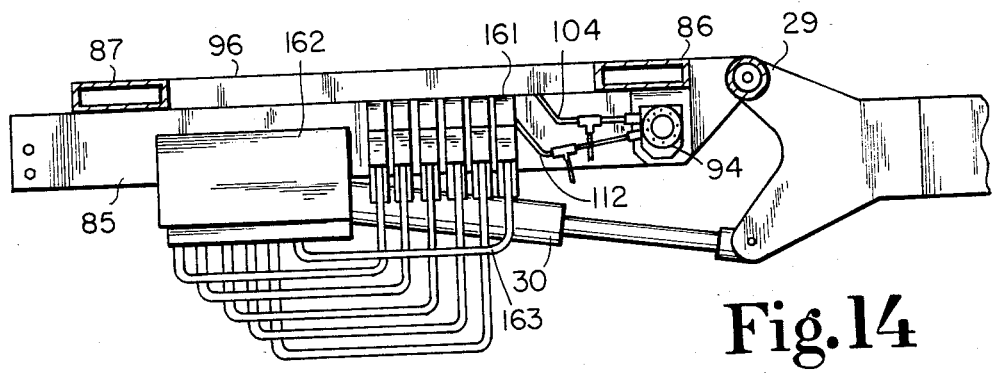
FIG. 14 is a cross-sectional view of the right side of the carriage, and particularly showing the location of the computer control unit and hydraulic valves.

The controlling components for the carriage and particularly for the hydraulically-operated arms are shown in FIG. 14. A number of proportional hydraulic valves, such as 161, are mounted on the carriage on the right side of the trailer. A central processing unit 162 is also mounted to the carriage and includes several conduits, each of which connects with one of the proportional valves. The conduit 163, for example, connects from the CPU to the proportional valve 161 and control connections extend within the conduit 163 for operating the valve 161 as desired. By way of example, it is shown in FIG. 14 that the hydraulic motor 94 connects through the hydraulic lines 104 and 112 to the proportional valve 161, and therefore the other hydraulic motor 93 is similarly connected with the proportional valve.

The proportional valves, such as 161, are operable to provide hydraulic fluid to the associated hydraulic components on command of the CPU. In this fashion, the various hydraulic cylinders and motors are selectively operable to manipulate the arms and carriage in the desired fashion. Proportional valves of the type shown as 161 are available from Double A, a division of Brown and Sharp. Although these valves are normally used to provide acceleration and deceleration to a hydraulic component, they are uniquely employed in the present invention as a means to balance two separate but desirably correlated cylinders or other hydraulic components. For example, the proportional valve 161 is operable to balance the fluid provided through the lines 104 and 112 in order to provide the desired control and operation of the hydraulic motors 93 and 94. The other hydraulic valves are connected with the primary and secondary cylinders, the leveling cylinder, the clamping cylinder and the locking pins.

Various elements of the support equipment are conveniently mounted on the trailer at the rear, down below the trailer floor and between the wheels. These components (not shown) would typically include a gasoline engine of perhaps 16 HP, a hydraulic pump and reservoir, fluid return and pressure filters, a temperature switch provided to maintain the hydraulic fluid temperature above 40° F., a battery and circuit breaker, a flow meter and pressure gauge, and associated controls. The keyboard for operation of the CPU is preferably installed under a panel in the floor of the trailer adjacent the rear end of the trailer.

Figure 15:
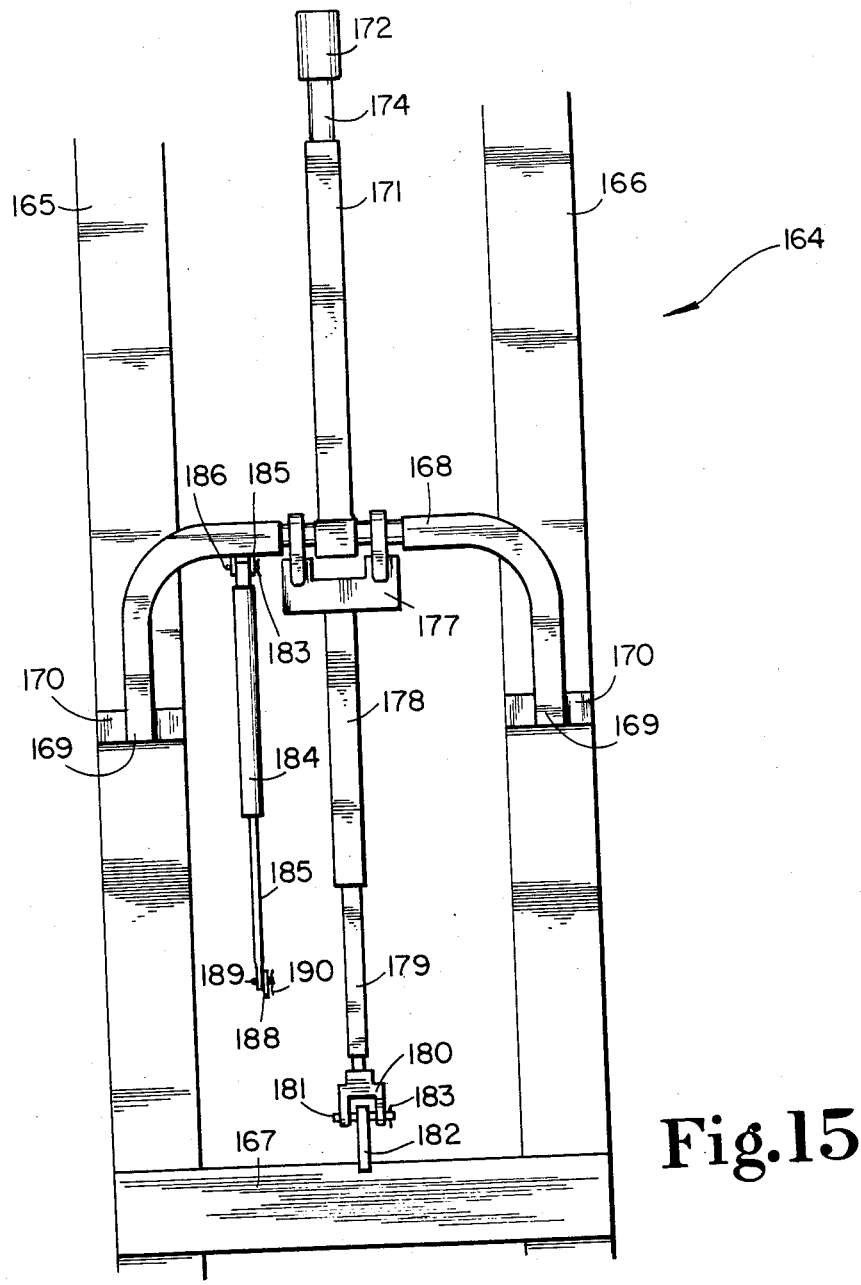
FIG. 15 is a front, elevational view of on embodiment of a vehicle support assembly mounted to the inside wall of the trailer.
Figure 16:
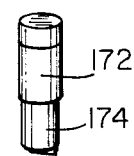
FIG. 16 is a perspective view of the support assembly of FIG. 15.
Figure 16:
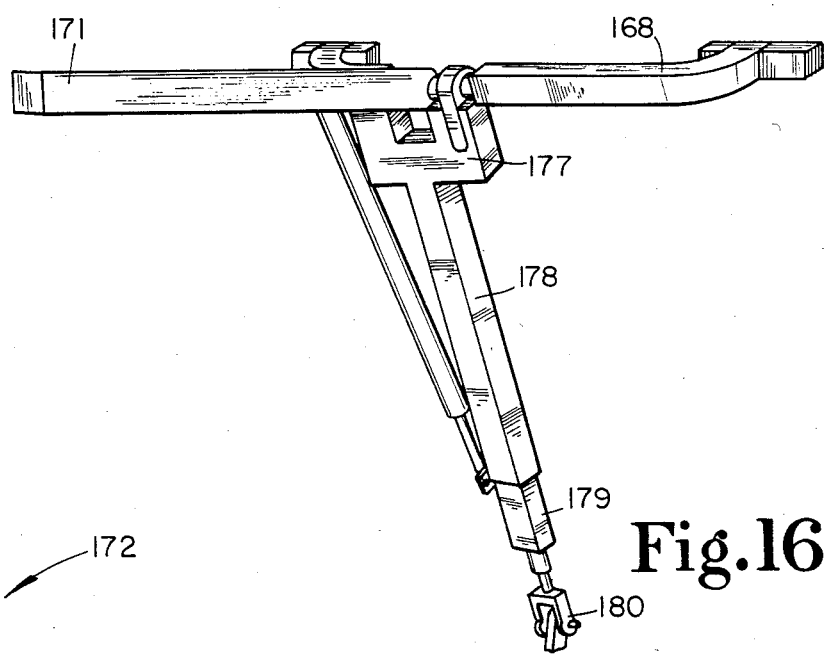
Figure 17:
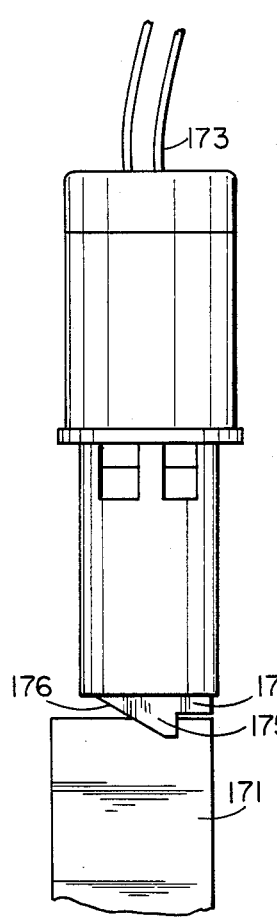
FIG. 17 is a side, elevational view of a solenoid valve useful with the support assembly of FIG. 15.

Spaced along the interior walls of the trailer are support arms utilized for carrying the automobiles within the trailer. Referring in particular to FIGS. 15 and 16, one embodiment for the support arms is shown. Further, the support arm 164 is shown in the upward or retracted position in FIG. 15, and is shown in the downward or extended position in FIG. 16.

Support arm 164 is shown mounted within channels 165 and 166 in the trailer wall and also supported on a cross member 167 extending between the channels. The support arm includes a generally U-shaped member 168 having ends 169 pivotally mounted to U-shaped supports 170 secured to the side walls of the channels 165 and 166, respectively. The support arm 164 further includes the support member 171 which is secured to the U-shaped member 168.

As shown in the drawings, the support arm has a first, vertical position in which the support member 171 and U-shaped member 168 are received against the inside wall of the trailer. The support arm also includes a second position (FIG. 16) in which the U-shaped member and support member extend generally horizontally.

The support arm is maintained in the first, vertical position by a solenoid valve 172. Wires 173 extend from the solenoid into and through the wall of the trailer to the control unit for operation of the valve. The valve includes a lock pin 174 which has a projection 175 receivable within a notch in the end of the support member 171. The leading edge 176 is tapered so that the lock pin is forced upwardly when the support member is physically moved against the wall surface. The lock pin 174 is biased in the downward or extended position and therefore retains the support member 171 against the wall surface until the solenoid is activated. Upon activation of the solenoid, the support arm is released to the downward position and will fall to that position as a result of gravity.

The support arm is held in the downward, horizontal position by a telescoping support assembly. This assembly includes a yoke member 177 which includes arms which rotatably receive the U-shaped member 168 in aligned apertures. The yoke member 177 is attached to an outer, telescoping member 178 within which is received an inner telescoping member 179. The telescoping members are constructed such that the inward travel of the member 179 is limited to that shown in FIG. 16, therefore to a position at which the support arm 164 is held in the horizontal position. To accommodate the movement of the support arm to the downward position, the inner telescoping member 179 includes a clevis 180 secured by a pin 181 to an apertured boss 182 secured with the cross member 167. In conventional fashion, the pin 181 may be held in place by a cotter pin 183. Thus, when the solenoid 172 is activated, the lock pin 174 is raised and the support arm will rotate downwardly to the horizontal position, at which point it is stopped by the limited travel of the inner telescoping member 179 within the outer telescoping member 178.

An air cylinder 184 is provided as a shock absorber for the downward movement of the support arm. Cylinder 184 is secured to a clevis 185 attached to the U-shaped member by a pin 186 and cotter pin 187. Similarly, the piston 185 is attached to a boss 188 attached to the trailer wall by a pin 189 that is received through aligned apertures in the piston and the boss and is held in place by a cotter pin 190.

Figure 18:
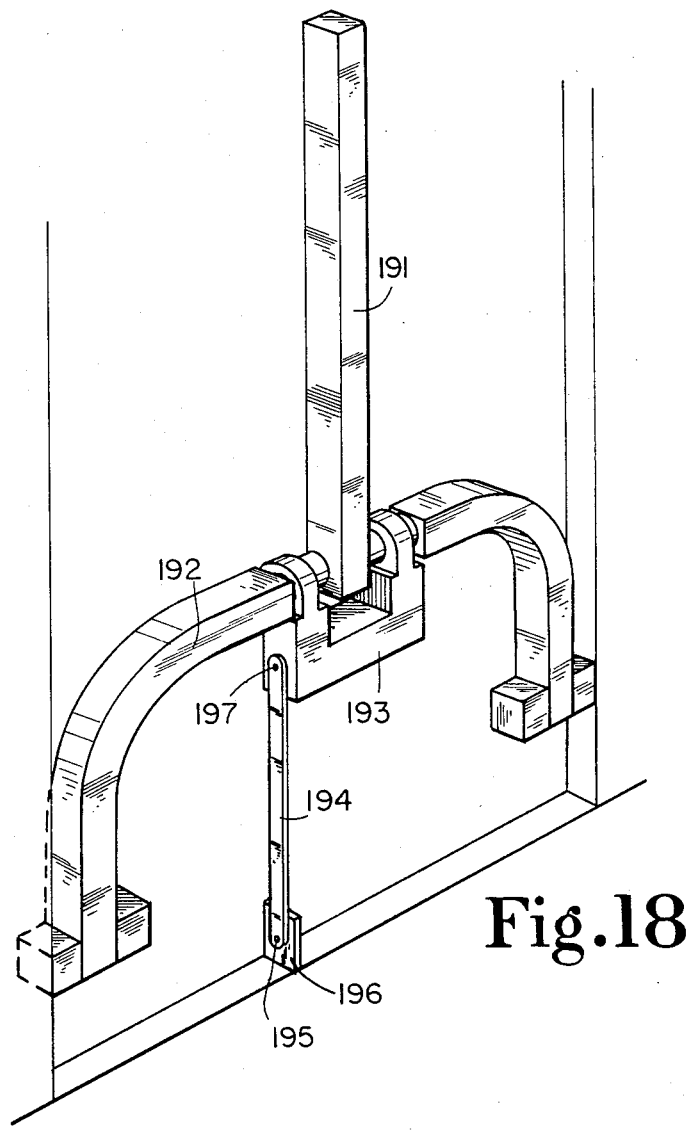
FIG. 18 is a perspective view of a second embodiment for a support assembly mounted within the trailer.

At other locations within the trailer, modified forms of the support arm as shown in FIGS. 15 and 16 are desirable. For example, adjacent the floors of the trailer there is not sufficient room and there is not need for the type of support assemblies as provided for the support arm 164. For these locations, the respective support member may be braced directly upon the floor, as shown, for example, in the embodiment of FIG. 18. As shown in this figure, there is provided a support member 191 attached to a U-shaped member 192 which in turn includes ends that are pivotally mounted to the inside wall of the trailer. A support yoke 193 is rotatably mounted to the U-shaped member. Arm 194 is mounted at one end by a pin 195 to a boss 196 secured with the trailer wall and at the other end by a pin 197 to the support yoke 193. When the support member 191 is rotated downwardly away from the side wall, the arm 194 causes the support yoke 193 to rotate relative the U-shaped member. As a result, the bottom of the yoke 193 as shown in FIG. 18 remains in that orientation and rests against the floor of the trailer with the U-shaped member 192 then being supported on the floor of the trailer by the yoke. The downward position for the alternate embodiment shown in FIG. 18 is similar to that for the third embodiment shown in FIG. 19.

Figure 19:
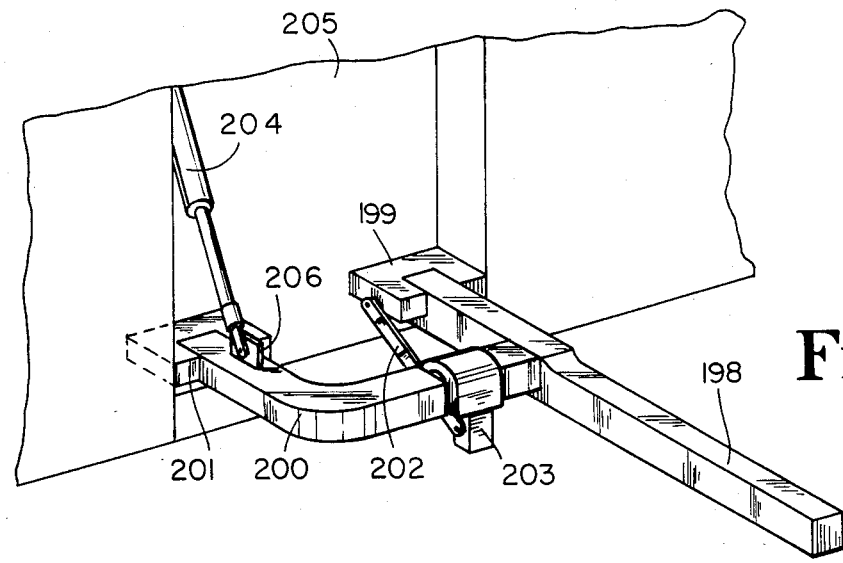
FIG. 19 is a perspective view of a third embodiment of a support assembly, shown mounted to the inside wall of a trailer in the down position.

The support arm as shown in FIG. 19 is a third embodiment and is useful in certain locations in the trailer for economics of space or for considerations of the desired location for the arm relative the normal vertical supports of the trailer. This embodiment is quite similar to that for FIG. 18, with the exception that the support member 198 extends inwardly and is directly mounted rotatably to the support block 199. In this embodiment, only half of a U-shaped support member 200 is employed, with it also terminating at an end which is rotatably mounted to a support block 201. Again, an arm 202 is pivotally mounted at its ends to the support block 199 and a collar member 203 to force the collar to rotate so that its base is received against the floor and supports the member 200 in the horizontal position.

For the embodiment of FIG. 15, it was indicated that a solenoid valve is used to release the support arm to the lowered, horizontal position. These arms are particularly useful for the upper level supports of the trailer, i.e. those arms that hold the vehicles which are suspended above other vehicles mounted on the floor. The advantage of the solenoid release for the arms is that these arms need be lowered only after the floor-mounted vehicle is in place, and a manual release would require a person to climb over the loaded vehicle in order to have access for changing the positions of the upper support arms. In contrast, the arms located adjacent the trailer floor can be manually operated since all of them may be lowered while the trailer is initially empty. For this reason, the support arms as shown in FIGS. 18 and 19 are not provided with a solenoid release valve. However, air cylinders, such as 204, are provided to retain the support arms in the upper position when desired. These cylinders 204 are mounted at the upper end to the side wall of the channel, such as 205, in which the support block 201 is mounted, and at their lower end to a boss 206 on the upper side of the member 200. By this connection, the cylinders are moved to a position beyond center when the support arms are raised to the fully vertical position. Thus, the initial movement of the support arm from vertical to horizontal requires compression of the air within the cylinder 204 and the force required to so compress the air may be selected to prevent the support arm from moving out of the vertical position under ordinary conditions. when it is desired to lower the support arms, the manual force necessary to compress the air within cylinders may be applied and the support arms will then rotate fully down to the horizontal position as shown for example in FIG. 19.

Figure 20:
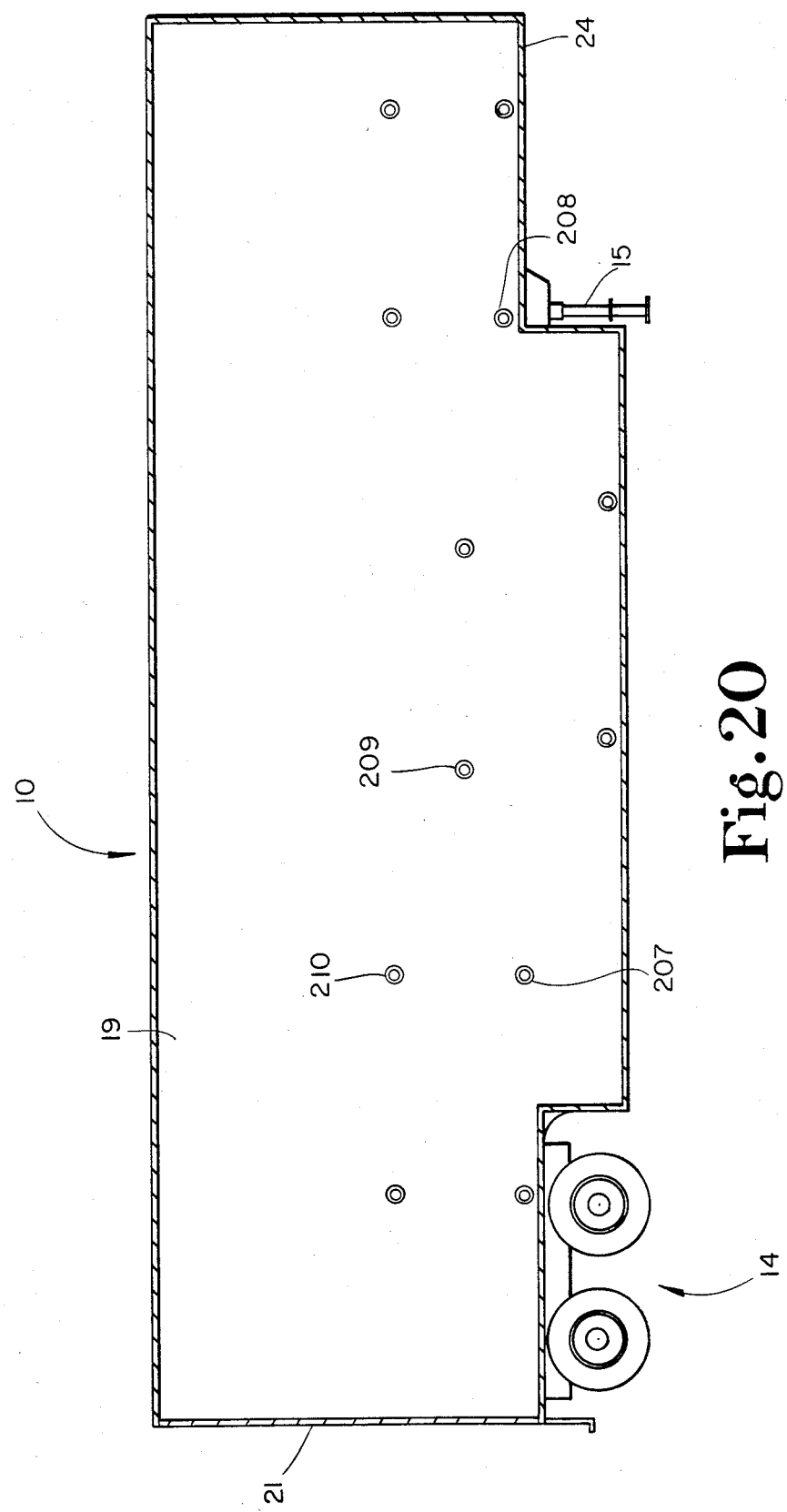
FIG. 20 is a cross-sectional view of a trailer and particularly showing exemplary locations for support rods useful in carrying vehicles within the trailer.

In FIG. 20, a preferred layout for the location of the support members of the various support arms is shown. It will be appreciated that various layouts would be appropriate, with this being a preferred distribution for the support members in a standard trailer intended for carrying six vehicles on top of the support arms. In this configuration, the spacing between the pairs of support arms is 85 inches.

More particularly, the trailer 10 includes wheels 14 and retractable support legs 15. The front floor 24 is approximately 10 feet in length, the recessed, center floor is approximately 24½ feet in length and the rear floor is approximately 10 feet in length. Measuring from the rear wall 21 of the trailer, the support members are in succession located at approximately 86 inches, 171 inches, 250 inches, 335 inches, 415 inches and 500 inches. In typical fashion, the rear floor is elevated somewhat less than the forward floor such that alignment of the support members means that the support member 207 is raised about 30 inches above the center floor, whereas the support member 208 is raised about 33 inches above the floor. The center support members, such as 209, are raised about 63 inches above the center floor an the front and rear pairs of upper support members, such as 210 are raised about 90 inches above the center floor. It has been found that by this layout, a trailer having a standard length of 45 feet can accommodate the carrying of six vehicles on support arms in the manner of the present invention. At the same time, the trailer is provided with standard length, height, and width to be suitable both for transport use and also to accommodate other types of cargo in standard fashion, with minimal interference from the support arm and loading system.

Figure 21:
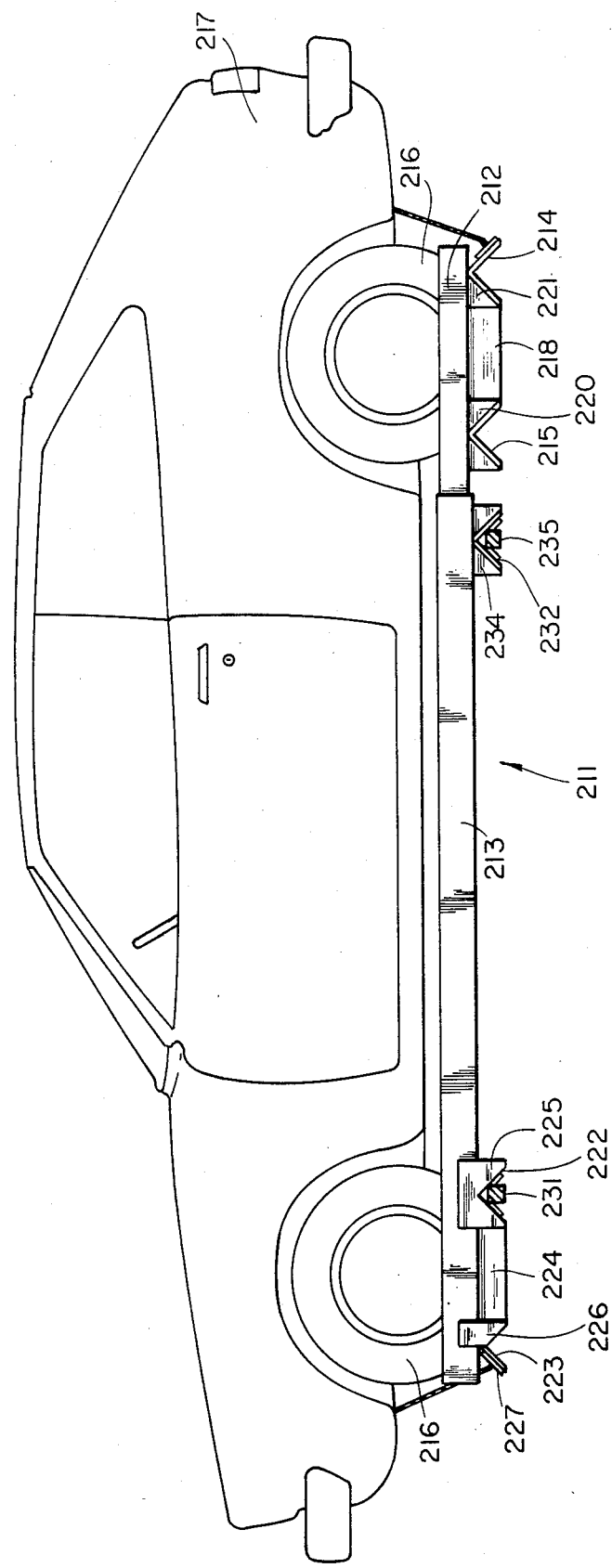
FIG. 21 is a side, elevational view of the outside of a wheel bar shown secured to a vehicle to facilitate loading and carrying of the vehicle within the trailer.
Figure 22:
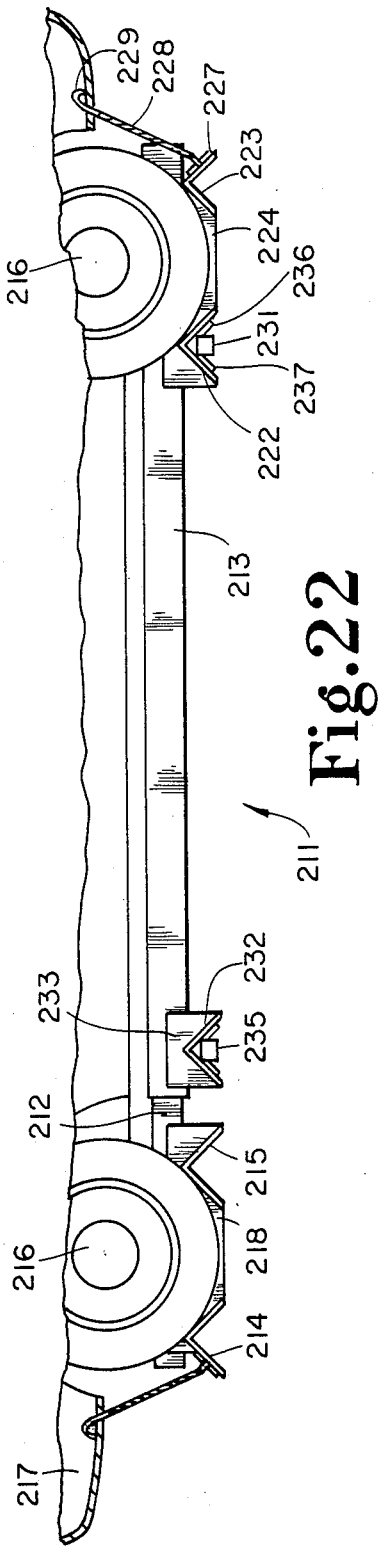
FIG. 22 is a side, elevational view of the inside of the wheel bar of FIG. 21.
Figure 23:
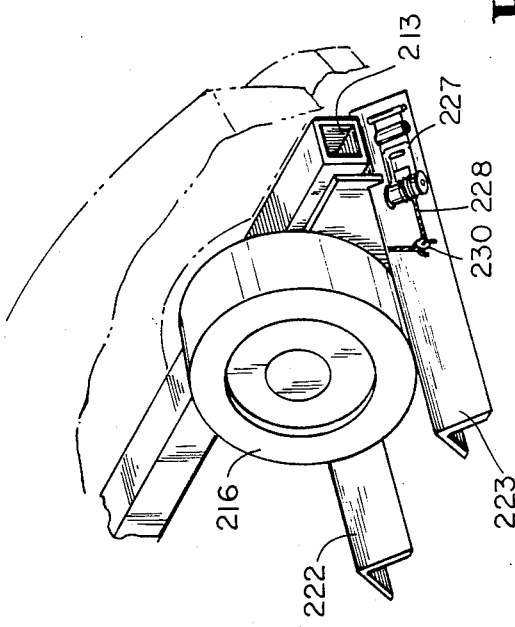
FIG. 23 is an inside, perspective view of the front portion of the wheel bar of FIG. 21, and particularly showing the attachment of the wheel bar to the vehicle.

In FIGS. 21-23 there is shown the wheel bars useful with the present invention. The wheel bars 211 are designed to be mounted on opposite sides of the vehicle to provide a firm support of the vehicles onto the support arms. A pair of mirror image wheel bars are used for each vehicle and are individually mounted to the vehicle in the manner to be described.

Wheel bar 211 comprises a pair of rectangular, telescoping arms 212 and 213. A first pair of inverted, V-shaped wheel supports 214 and 215 is mounted to the telescoping member 212 for reception of the rear wheel 216 of the vehicle 217. The wheel supports 214 and 215 are mounted to a plate 218 welded on the inside of the wheel bar and further are secured to the inner telescoping arm 212 by a pair of brace members 220 and 221 secured adjacent the outer side of the arm.

The wheel bar 211 further includes a pair of front wheel supports 222 and 223. These wheel supports are secured to the outer telescoping arm 213 and are braced therewith by means of an interior plate 224, and exterior brace members 225 and 226.

The wheel bars are secured onto the vehicle by means of the wheel supports and hand ratchets, such as 227, located on the front and rear wheel supports. The wheel bars are positioned by adjusting the telescoped relationship of the arms 212 and 213 so that the vehicle wheels are received between the front and rear pairs of wheel supports. The wheel bars are then slid into position beneath the wheels, for example as shown in FIG. 23. The hand ratchets 227 include a cable 228 terminating in a hook 229 which is then secured at a suitable location of the vehicle, such as the tie down holes at the underside of the vehicle. The ratchets 227 are preferably hand operable and are positioned with the cable 228 extending about a pulley 230 also mounted on the wheel support and useful for directing the cable to the underside of the vehicle. Once the hook has been positioned, the ratchet is tightened until the wheel bar is pulled securely against the wheels of the vehicle. By the positioning of the pulley 230 as shown in FIG. 23, the tightening of the wheel bar will actually cause the wheel supports to reach a final position in which they are turned upwardly toward the underside of the vehicle.

The wheel bars include positions for placement upon the support arms previously described. As shown in the drawings, one of the trailer support arms 231 is received by one of the forward wheel supports 222. It has been determined that the typical weight distribution for a vehicle permits this wheel support to operate as the front placement position for one of the support arms of the trailer wall. Since the space between the support arms for the trailer is fixed, the two support positions for the wheel arms must also be fixed relative one another. Therefore, a second support member 232 is secured to the outer telescoping arm 213 by means of inner plate 233 and outer plate 234. In this fashion, the position between the support members 222 and 232 remains fixed since they are both attached to the same, outer telescoping arm 213, but at the same time the inner arm 212 is free to telescope with respect to the other arm in order to accommodate vehicles having different wheel bases. As shown, a second support arm 235 of the trailer is received by the inverted V-shaped support member 232. Also as shown, shims such as 236 and 237 are included on the undersurface of the V-shaped members receiving the support arms to provide a more firm engagement of the support arms by the members and also to eliminate the possibility that the vehicle would move off of the support arms upon sudden stopping or starting of the trailer.

What I claim is:

1. A trailer apparatus for transporting vehicles and other cargo, which comprises:

an enclosed body including upstanding side walls, a front wall, a floor, a top and a rear end opening;

door means mounted to the rear end of said body for closing the rear end opening of said body;

wheel means connected with said body for carrying said body along a support surface;

hitch means connected with said body for connecting said body with a towing vehicle;

support means mounted within said body for supporting several vehicles within said body, said support means further being for supporting at least one vehicle in a position above a second vehicle within said body; and powered means mounted within said trailer for loading vehicles from outside of said body to within said body and in position upon said support means, said powered loading means further being for lifting vehicles upwardly from an outside surface and for moving vehicles longitudinally of said body to a position within said body;

said powered loading means including arm means for grasping vehicles outside of said body and for lifting the vehicles for loading into said body and carriage means for moving vehicles longitudinally of said body into position within said body, said arm means including a pair of arm assemblies, each of said arm assemblies including a lifting arm means for lifting a vehicle from below the floor of the body to a position at least as high as the floor of said body, a translating arm means for moving a vehicle longitudinally of said body relative said carriage means, and a clamping arm means for grasping the vehicle for permitting carrying of the vehicle by said lifting arm means and said translating arm means, each of said pair of arm assemblies including a primary arm pivotally connected with said carriage means, primary power means for pivoting the primary arm with respect to said carriage means, a secondary arm pivotally connected with the primary arm, secondary power means for pivoting the secondary arm with respect to the primary arm, a clamping arm pivotally connected with the secondary arm and clamping power means for pivoting the secondary arm with respect to the secondary arm.

2. The apparatus of claim 1 in which each of said pair of arm assemblies further includes a leveling arm means for maintaining a vehicle in a level orientation during loading and unloading of the vehicle relative said body.

3. The apparatus of claim 1 in which each of said arm assemblies further includes a leveling arm pivotally connected with the secondary arm and leveling power means for pivoting the leveling arm with respect to the secondary arm, the clamping arm being pivotally connected with the leveling arm.

4. The apparatus of claim 1 in which said carriage means includes:

a carriage including a carriage frame;

carriage wheel means mounted to said carriage for transporting said carriage longitudinally of said body along tracks; and a pair of tracks, each track extending horizontally and being mounted on the interior of one side wall of said body, said carriage means including wheels received within said tracks to permit said carriage to roll longitudinally of said body along said tracks.

5. The apparatus of claim 4 in which said tracks are mounted adjacent the top of said body.

6. The apparatus of claim 5 in which said tracks include a lower, upwardly facing wheel surface and a second, downwardly facing wheel surface, said wheel means including a first pair of wheels engaging one of said pair of tracks and a second pair of wheels engaging the other of said pair of tracks, one of each pair of wheels being received against the lower, upwardly facing wheel surface of said tracks and the other of each pair of wheels being received against the upper, downwardly facing wheel surface of said tracks.

7. The apparatus of claim 4 in which the pair of arm assemblies are horizontally aligned and which further includes connection means for connecting together the pair of arm assemblies for facilitating maintenance of horizontal alignment of the arm assemblies.

8. The apparatus of claim 4 in which each of said pair of arm assemblies further includes a leveling arm means for maintaining a vehicle in a level orientation during loading and unloading of the vehicle relative said body.

9. The apparatus of claim 5 in which each of said pair of arm assemblies includes a primary arm pivotally connected with said carriage means, primary power means for pivoting the primary arm with respect to said carriage means, a secondary arm pivotally connected with the primary arm, secondary power means for pivoting the secondary arm with respect to the primary arm, a clamping arm pivotally connected with the secondary arm and clamping power means for pivoting the secondary arm with respect to the secondary arm.

10. The apparatus of claim 9 in which each of said arm assemblies further includes a leveling arm pivotally connected with the secondary arm and leveling power means for pivoting the leveling arm with respect to the secondary arm, the clamping arm being pivotally connected with the leveling arm.

* * * * *